United States Patent [19]
Habib

[11] 3,851,563
[45] Dec. 3, 1974

[54] MACHINE TOOL
[76] Inventor: Robert Habib, 3 Rue de Beaumont, Geneve, Switzerland 1200
[22] Filed: June 29, 1972
[21] Appl. No.: 267,616

[30] Foreign Application Priority Data
June 30, 1971 Switzerland.................... 9576/71
June 15, 1972 Switzerland.................... 8921/72

[52] U.S. Cl.............................. 90/11.5, 51/48 HE
[51] Int. Cl................................................ B23c 3/32
[58] Field of Search...... 90/DIG. 4, 11.5; 51/48 HE, 51/48 R, 95 LM, 95 R, 232, 219 R, 219 PC

[56] References Cited
UNITED STATES PATENTS

| | | | |
|---|---|---|---|
| 376,815 | 1/1888 | Coleman | 51/95 R X |
| 645,018 | 3/1900 | Schmaltz | 51/48 HE |
| 1,689,135 | 10/1928 | Hanson | 51/48 HE X |
| 2,449,179 | 9/1948 | Scharping | 51/95 LH X |
| 2,752,740 | 7/1956 | Mouw | 51/232 |
| 3,066,456 | 12/1962 | Ramge | 51/219 R |
| 3,546,824 | 12/1970 | Ramge | 51/232 X |

FOREIGN PATENTS OR APPLICATIONS
1,235,278   6/1971   Great Britain

Primary Examiner—Andrew R. Juhasz
Assistant Examiner—Z. R. Bilinsky
Attorney, Agent, or Firm—Robert E. Burns; Emmanuel J. Lobato; Bruce L. Adams

[57] ABSTRACT

In a grinding or milling machine for machining spiral cylindrical cutters with a hemispherical head in one operation, comprising a horizontal displaceable carriage, or orientable work tool holder, a headstock including a cutter-supporting spindle adapted to slide on the carriage along a direction parallel to the axis of the spindle, and means for helically driving the headstock spindle, the headstock is secured on a support mounted on the carriage for rotation and inclination respectively about (a) a vertical axis intersecting the axis of the spindle and (b) a horizontal axis perpendicular to the plane of said intersecting axis.

3 Claims, 5 Drawing Figures

MACHINE TOOL

The invention relates to machines such as grinding or milling machines comprising an orientable work tool such as a grinding or milling wheel and a mobile headstock for supporting a workpiece to be machined.

Grinding machines may be used to grind workpieces into various shapes to form tools such as spiral milling cutters terminating with a substantially hemispherical head.

In a known device for grinding cutters of this type, described in United Kingdom Pat. No. 1,235,278, a cutter is moved with a spiral movement in a horizontal plane and spiral grinding of the hemispherical end is achieved by a rotation of the workpiece about a vertical axis combined with the helical movement. However, the adjustment of a machine with such a device is extremely delicate, and the device is not suitable for accurate grinding of cutters in which the cutting teeth on the hemispherical end are defined by planes of intersection with the hemisphere rather than the complex spiral shapes generated by said device.

The invention therefore aims to provide a novel machine which can be used, inter alia, to grind spiral cutters terminating with a hemispherical head in a single operation.

According to the invention, there is provided a machine of the type referred to above comprising a generally horizontal carriage, an orientable work tool carrier, means for setting the position of the carriage relative to the work tool carrier in a generally horizontal plane, a support mounted on the carriage for rotation and inclination respectively about a vertical axis and an horizontal axis, a headstock including a rotatable spindle adapted to support a workpiece, the headstock being slidably mounted on the support along a direction parallel to the axis of the spindle, the axis of the spindle being adapted to intersect said vertical axis with said intersecting axes defining a plane perpendicular to the horizontal axis, and a device mounted on the support for helicoidally driving the headstock spindle.

A device for helicoidally driving a headstock spindle has already been described in Swiss Pat. No. 343,832; however the arrangement of this known device does not enable variation of the helical trajectories from 0° to 90°.

According to a preferred embodiment of the invention, said support includes a generally planar platform disposed with said horizontal axis lying in or generally parallel to the plane thereof, said device for helicoidally driving the headstock spindle including a rectilinear guide pivotally mounted on the platform about an axis perpendicular to the plane thereof and being orientable from 0° to 90° in relation to the direction of sliding of the headstock along the support, a cursor movable along the guide, and means for transforming the longitudinal and transversal components of movement of the cursor relative to said direction respectively into a sliding movement of the headstock along the support and a rotation of the headstock spindle about its axis.

Moreover, it will be seen that with a machine according to the invention, it is possible to back off or reflute the cutting edge of a cutter without adjusting the cutter to be ground, but simply by changing the grinding tool.

An embodiment of the invention will now be described, by way of example, with reference to the accompanying drawings, in which.

Figure 1:
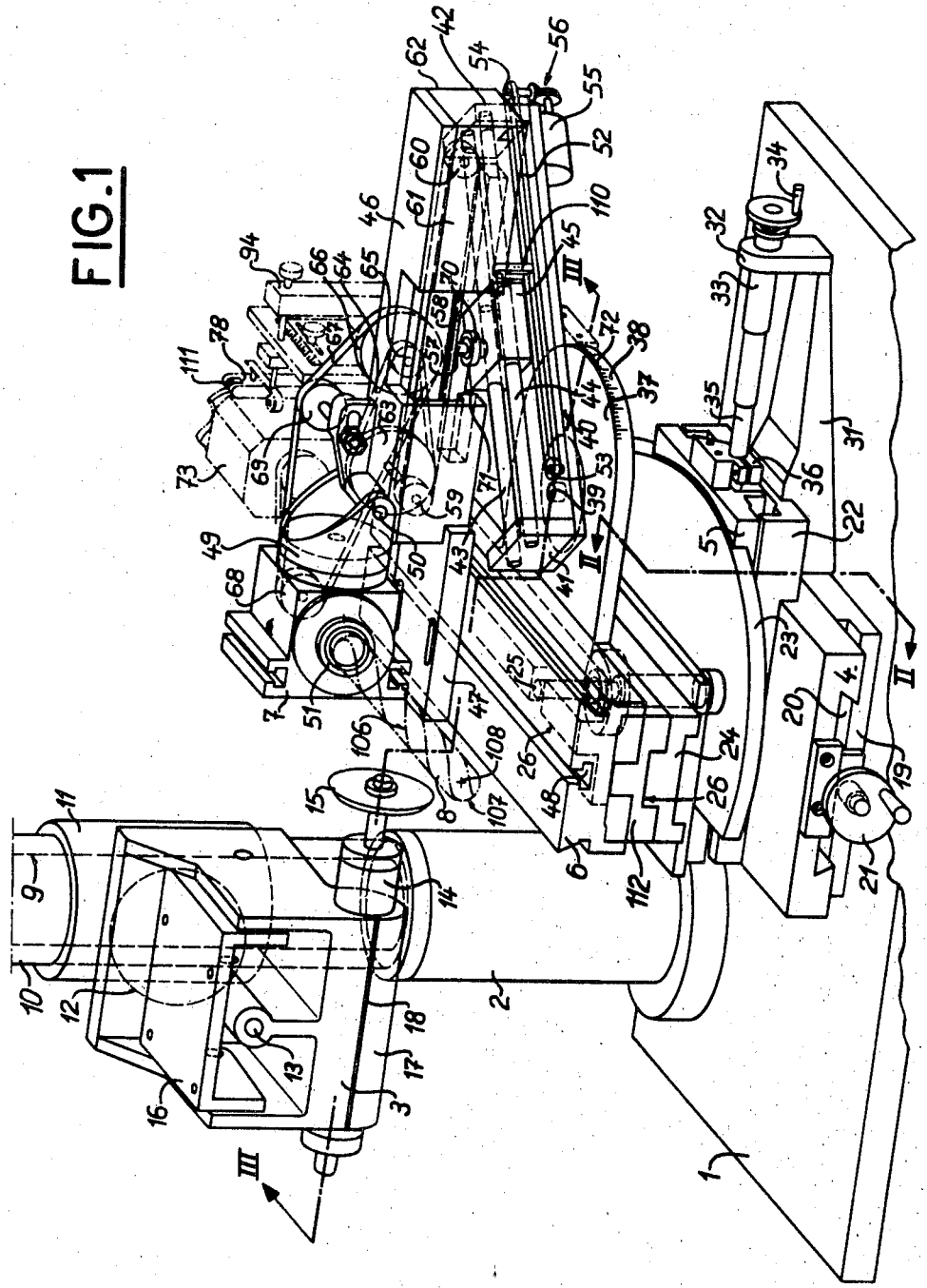
FIG. 1 is a schematic overall axiometric perspective view of a grinding machine according to the invention.
Figure 2:
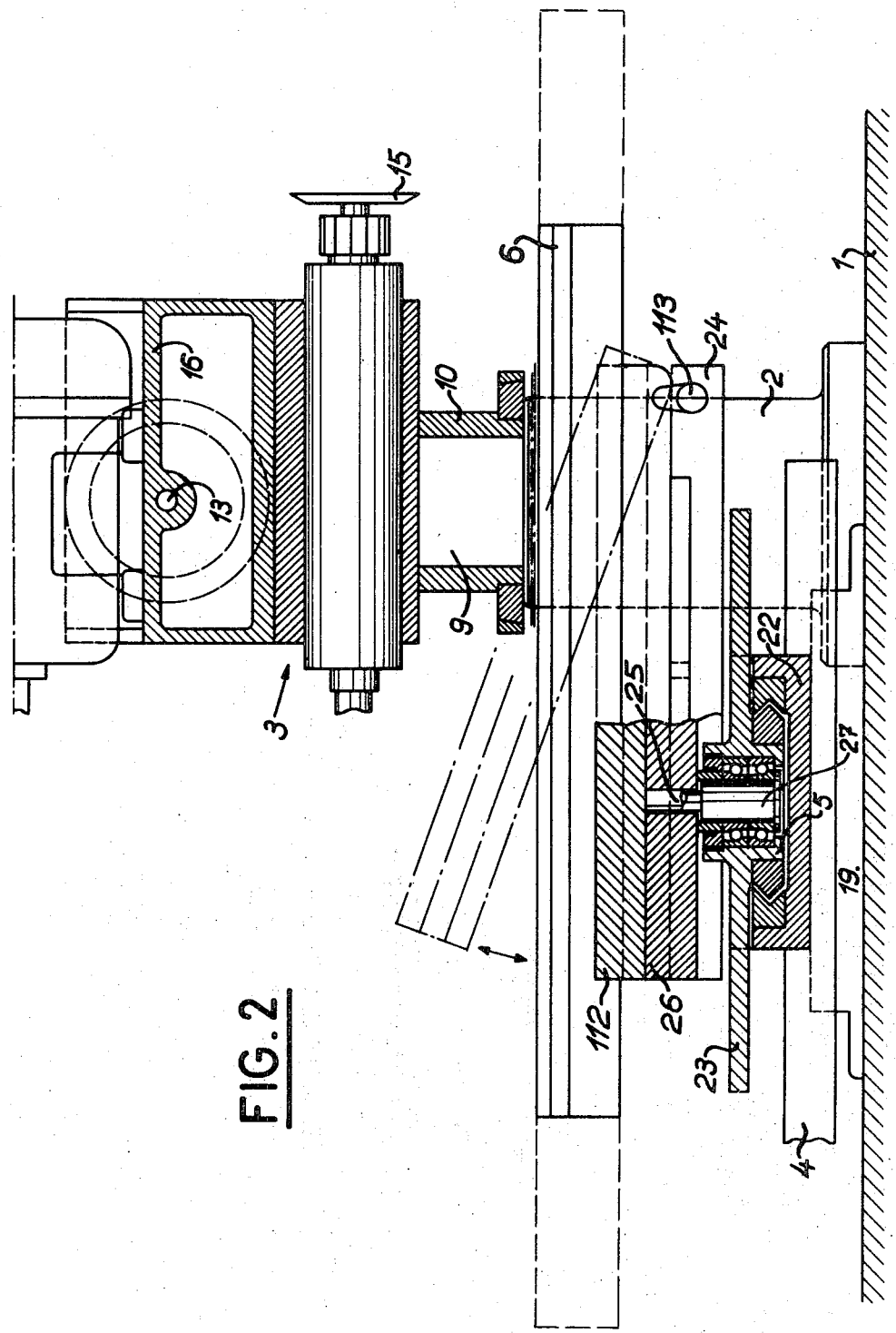
FIG. 2 is a partial elevational and cross-sectional view taken along line II—II of FIG. 1, with the grinding wheel support shown turned through 90°.

The grinding machine shown in the drawings comprises a base 1 on which is mounted on the one hand a column 2 carrying an orientable grinding wheel carrier 3 and, on the other hand, a carriage including orthogonal horizontal slides 4 and 5 supporting a further slide 6 on which a headstock 7 for a workpiece or tool 8 to be ground is fixed.

The column 2 is of a known type and includes a fixed vertical central spindle 9 about which a sleeve 10 is rotatably mounted. A bearing 11 slidably mounted on this sleeve may be moved and set in position by means of a rack and pinion, not shown. Bearing 11 is provided with a vertical circular plate 12 on which is journalled, by means of a horizontal shaft 13, the grinding wheel carrier 3 which carries a grinding wheel 15 on a driving shaft 14 rotatably driven by means of a belt and motor, not shown, which are secured onto a plate 16 of carrier 3. The grinding wheel carrier 3 is thus orientable about the vertical axis of column 2 and the horizontal axis of shaft 13 and may be set in any desired position. Shaft 14 may also be axially moved in relation to carrier 3 and set in position by the gripping action of an elastically deformable part 17 separated from the main body of carrier 3 by a slot 18.

The carriage slide 4 is slidably mounted on a fixed base 19 by means of a dove-tail 20, and may be set in position in a conventional manner by means of a crank 21 actuating a screw mechanism. Slide 4 carries a transversal section 22 slidably receiving transversal slide 5 mounted on needle bearings. On the transversal slide 5 is fixed a horizontal plate 23 which serves as a platform for rotation of a section 112 of a support for slide 6, also mounted on needle bearings.

Section 22 carries a lateral arm 31 at the other end of which is fixed a bearing 32 supporting a screw 33 for controlling movement of slide 5 by means of a crank 34. An end 35 of screw 33 is fixed to the slide 5 by gripping means in the form of jaws 36 in such a manner that it is possible to disengage the advancing device of slide 5 by loosening jaws 36.

Section 112 is mounted so as to be both rotatable and inclinable relative to the carriage (4, 5, 23). This novel arrangement is provided by means of a vertical shaft 25 whose upper end is screwed into a raised central part 26 of an intermediary carriage section 24 and whose lower part is pivoted in a bore 28 of slide 5 by means of two ball bearings 29 and 30. Section 112 is pivoted about a horizontal shaft 113 at one end of part 26 and may be locked in a desired inclination by locking means, not shown, of a known type.

Section 112 has a generally planar lateral extension 37 forming a platform having a semi-circular edge 38 at the centre of which is a pivot 39 about which can turn a horizontal arm 40. At the ends of arm 40 are two upright plates 41 and 42 between which are secured two spaced apart parallel cylindrical bars 43 and 44 serving as guide rails for a cursor 45. Above bars 43 and 44 extends a substantially horizontal arm 46 solidly fixed to a plate 47 resting on slide 6 and secured thereto in a known manner in a T-groove 48, arm 46 extending transversally to slide 6. The headstock 7 is rotatably mounted on a capstan 49, which capstan is pivotally connected to the arm 46 about a pin 50. Locking means, not shown, enable the capstan 49 and the headstock 7 thereon to be secured in a desired position relative to arm 46, plate 47 and slide 6, notably with the axis of headstock spindle 51 extending parallel to the longitudinal direction of motion of slide 6 on section 112 and intersecting an extension to the axis of pivot 25.

Arms 40 and 46 are the basic elements of a device for helicoidally driving the headstock spindle 51 to enable a grinding of cutters with a helicoidal cut. Said device is adapted to transform rectilinear movement of cursor 45 along guide bars 43 and 44 on the one hand into a rectilinear movement of slide 6 relative to section 112 and, on the other hand, into rotation of headstock spindle 51 carrying tool 8 to be ground. Cursor 45 is driven along guide rods 43, 44 by means of a belt 52 one point of which is fixed to the cursor 45 by a securing piece 110 and which passes around rollers 53 and 54 able to turn about axes perpendicular to arm 40. Roller 53 serves as an idler and the other driving roller 54 is fixed at the end of a shaft driven by means of a bevel gear 56 connected to a motor unit 55 secured under arm 40, said unit including a variable speed reversible motor and a reducer. Cursor 45 has a projection in the form of a vertical shaft 57 whose end is fixed to a belt 58 mounted inside hollow arm 46 and winding about two rollers 59 and 60 freely rotatably mounted between the lateral walls 61 and 62 of arm 46. Roller 59 is integral with or drivably connected to a transmission pulley 63 driving, by a belt 64, a pulley 65 integral with a concentric pulley 66 driving, by a transmission belt 67, a headstock pulley 68 for driving spindle 51. Belt 67 is held under tension by a tension pulley 49.

Shaft 57 of cursor 45 also carries a pulley 70 formed by a ball bearing which is able to move in a longitudinal channel 71 in the underside of arm 46, rolling against one or the other of the lateral generally upright walls of this channel with a very small play. Thus, when arm 40 is fixed in a given angular position on the platform 37, movement of the cursor 45 will, on the one hand, drive the belt 58, i.e., rotate headstock spindle 51, and, on the other hand, drive slide 6 along section 112 by acting on the arm 46 through roller 70. Upon oblique movement of the cursor 45, in relation to the arm 46 and slide 6, the headstock spindle 51 will thus undergo a helicoidal movement, the pitch of the helix being a function of the angular position of arm 40 in relation to slide 6. This angular position is set by means of a graduation 72 on support 37.

Figure 4:
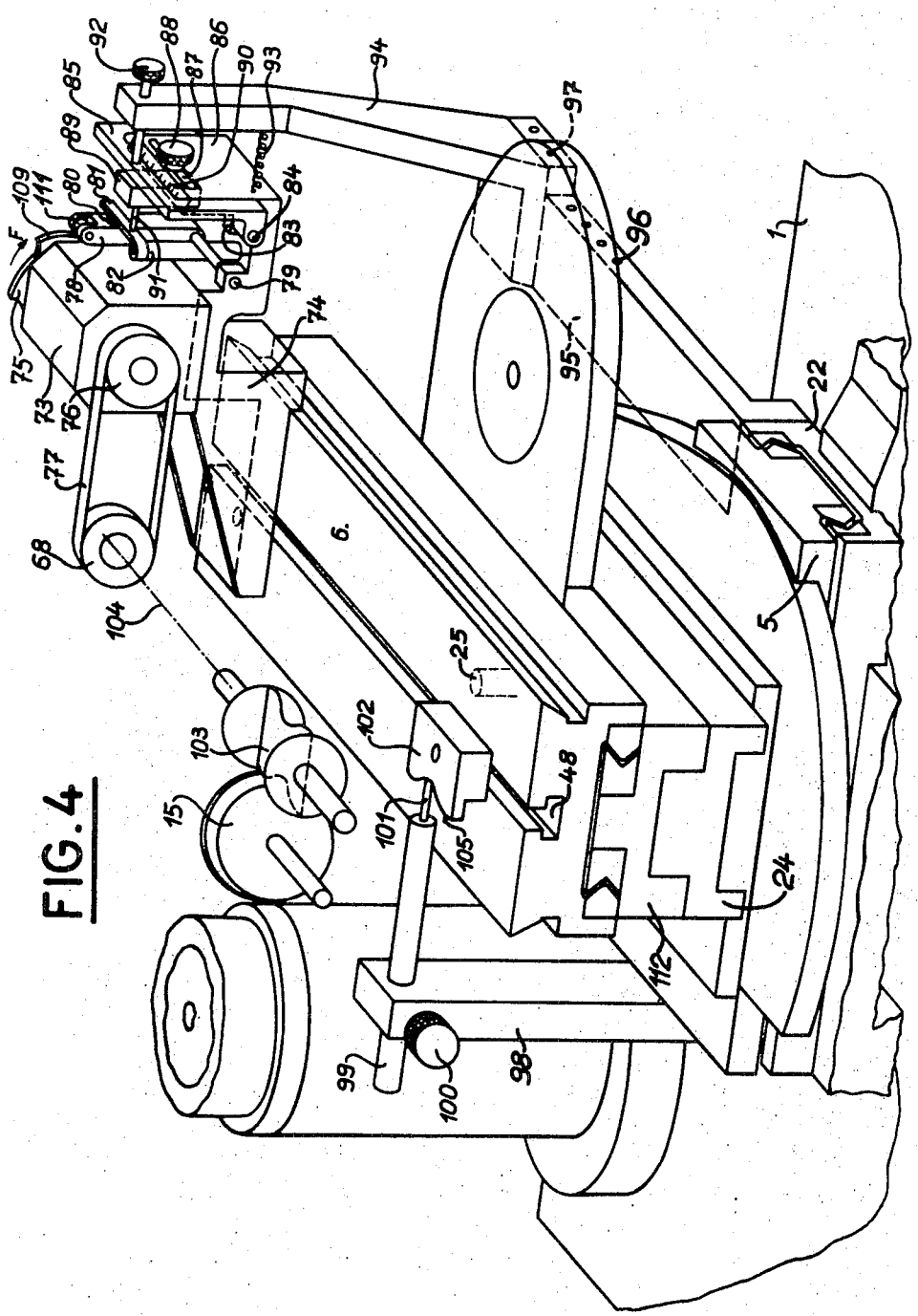
FIG. 4 is a schematic axiometric perspective view showing a backing off or refluting device.

The machine also includes a backing off or refluting device, the elements of which are shown in detail in FIG. 4, including a headstock 73 mounted on a support 74 removably secured on slide 6. The spindle of headstock 73 carries at one end a cam 75 determining the angle, the number of teeth and the maximum depth of backing off of the cutting tool to be ground and, at the other end, a pulley 76 which may be connected to the pulley 68 of headstock 7 by a transmission belt 77. Against cam 75 bears the end of a lever 78 pivotally mounted about a generally horizontal axle 79, (i.e., parallel to slide 6) and provided with a finger 80 against which bears a generally horizontal second lever 81 pivotally mounted about a generally vertical shaft 82. On a parallelepipedic shoulder 83 of support 74 is pivotally mounted, about a generally horizontal axle 84, a U-shaped part 85 between the arms of which is a rectangular end part 86 of support 74. Part 86 has a generally horizontal slot 87 through which passes a knurled-headed screw 88 screwing into a stud 89 held vertically by its flat base resting on shoulder 83. By means of knurled screw 88, it is possible to fix stud 89 in a desired position along slot 87, the position being indicated by a graduated scale 90 carried by the upper inclined edge of part 86. A pin 91 slidably passing through stud 89 transmits the movement of lever 81 to lever-forming part 85. This part 85 is held against a stop-forming adjustable screw 92 by a traction spring 93 secured between part 86 and an arm 94 carrying the screw 92 and removably fixed to a bracket 95 fixed to section 22 of slide 5. Arm 94 and bracket 95 have corresponding holes 96 and 97 enabling the arm 94 to be precisely fixed in a desired position along bracket 95.

On base 1 is also fixed a vertical post 98 (FIG. 4) carrying a horizontal cylindrical rod 99 whose axial position may be chosen at will and locked by means of a screw 100. An end of rod 99 carries a stop-forming finger 101 adapted to cooperate with a template 102 removably secured on slide 6 for the grinding of profiled cutters, as will be described below.

Several examples of use of the machine will now be given to illustrate operation thereof and the large number of possibilities for grinding cutting tools of many shapes, notably tools having a spherical head, without it being necessary to dismount an accessory after use in order to replace it with another accessory. The only element which, in certain cases, has to be removed is arm 94; alternatively this arm could be made foldable so that it would no longer be necessary to remove it when the backing off or refluting device is not required to be used.

The grinding of an overall cylindrical cutter having a profile such as that shown in axial cross-section at 103, FIG. 4, will now be described, 104 designating the axis of the headstock spindle 51 along which the cutter is secured. In this case, the headstock spindle 51 and cutter are angularly and translationally locked relative to their support. The template 102 has a profile 105 reproducing the profile 103 of the cutter to be made. The end of finger 101 is positioned exactly vertical to the point of action of the grinding wheel 15 on the cutter. In case slide 6 is rotatably locked on carriage 4/5, it is unlocked so as to be able to freely turn about its pivot 25. Slide 5 is also freed. The operator then grips the ends of slide 6 and brings the template 102 against the end of finger 101 so that the grinding wheel 15 engages the workpiece. To grind the profile, the operator then moves slide 6, entirely free to move in a horinzontal plane, whilst bearing slightly against this slide towards finger 101 so that template 102 remains in contact with finger 101. Orientation of slide 6 to ensure that the cutter is presented to the grinding wheel 15 at the most favourable angle is carried out by the operator. To pass to the following part of the indent or profile 103 of the workpiece, the axis 104 of spindle 51 (FIG. 1) is turned to bring it to a new locked position by means of a known type of indexing head, not shown, mounted on the headstock 7.

Figure 5:
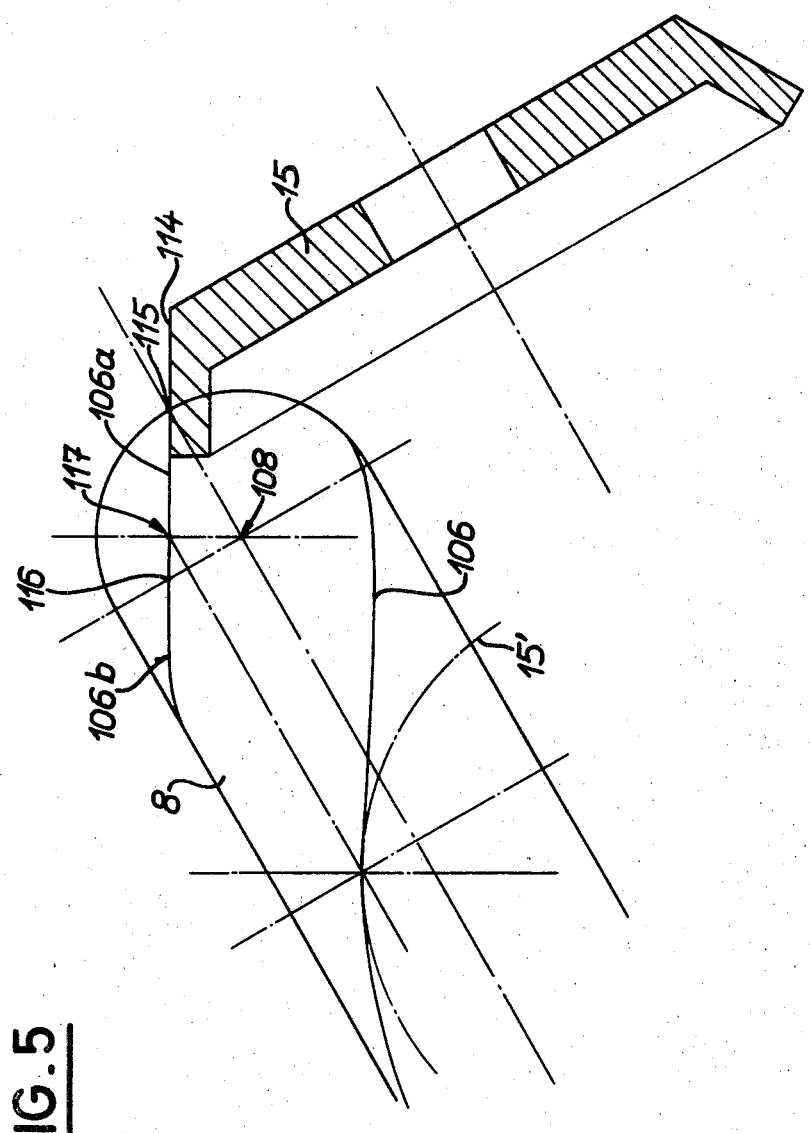
FIG. 5 is a schematic diagram illustrating operation of the machine with the support inclined.

The grinding of a helicoidal cutter with a hemispherical head, as schematically shown in FIGS. 1 and 5, will now be described.

The cutter 8 is of overall cylindrical shape, but could alternatively be conical, with helicoidal edges 106 and terminates at one end with a hemispherical head whose centre is at 108. To cut these edges 106, a cylindrical cutter with a hemispherical end is mounted on the spindle 51 as shown in FIG. 1.

Suppose, for example, that the cutter edges 106 must make an angle of 20° in relation to the axis of the helix. Firstly platform 37 and slide 6 are pivoted about axle 113 and set at an inclination of 20°, at least approximately. The centre 108 of the hemispherical end is then brought into the extension of the vertical axis of pivot 25 and the slide 6 is locked relative to platform 37, itself locked at an inclination of 20°.

Figure 3:
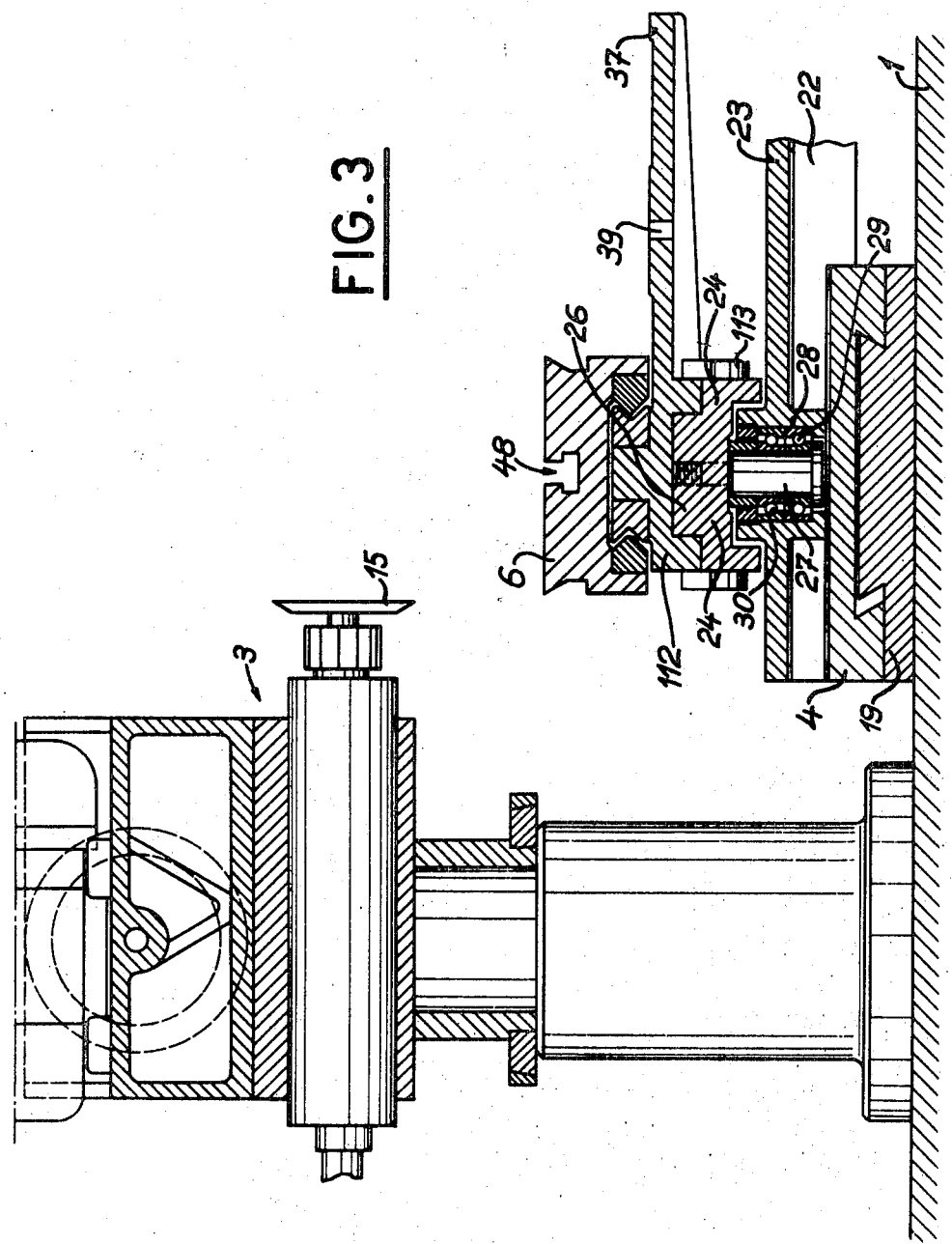
FIG. 3 is a partial elevational and cross-sectional view taken along line III—III of FIG. 1.

The spindle 14 is then inclined so that the surface 114 of grinding wheel 15 is horizontal and at the same level as the point of intersection 115 of the hemispherical surface and the axis of the cutter. Grinding wheel 15 is then brought into contact with the point 115, the axes of the cutter 8 and of the grinding wheel 15 having been disposed coplanar, i.e., the axis of the cutter 8 lies in a plane parallel to the plane of FIG. 3 by turning slide 6 and its support about pivot 25 by 90° relative to the position shown in FIG. 1. The cutting angle is adjusted as necessary by means of the grinding wheel.

The helicoidal advancing device is also set by bringing pivoting arm 40 to face the graduation 72 corresponding to the desired pitch and is locked in this position. The machine is then ready for use.

The workpiece is ground starting from its point 115. Slide 6, its support, and section 112, which are free to rotate, are turned by hand about pivot 25, the hemispherical end 107 of cutter 8 thus being rotated about its centre 108. A "spherical" grinding is thus provided along an edge defined by a plane of intersection with the hemispherical head inclined at 20° to the axis.

After having turned the slide 6 and the cutter 8 through 90°, they are locked in relation to the slide 5 and the motor unit 55 of the helicoidal advance device is switched on. The cutter 8, still in contact with the grinding wheel 15, is thus made to undergo a helicoidal movement, an intermediary position of the wheel 15 being shown in broken lines at 15' (FIG. 5).

The helix 106b on the cylindrical surface begins at point 116, whereas the "spherical" grinding ends at a point 117 on the hemispherical surface close to the joint between the hemispherical and cylindrical surfaces. However, in practice it is found that the joining of points 116 and 117 takes place satisfactorily. The cutting angle is zero at the end point 115, increases up to 116, and remains constant along the helix 106b.

The conception of the helicoidal guiding device is such that a helicoidal movement with an angle of slope selected between 0° and 90° can be provided. Thus, the automatic advance device controlled by the motor unit 55 may, if required, be used either solely to rotate the spindle 51, or solely to advance slide 6 without rotation of the spindle 51, according to whether the arm 40 is perpendicular to or parallel to slide 6.

To then carry out a refluting or backing off operation on cutter 8, it is sufficient to change the grinding wheel and repeat the same operations, without modifying the position of the cutter, nor the adjustments of slide 6 and the helicoidal advance device. The backing off angle is thus determined by the grinding wheel employed.

If it is desired to back off by means of the device shown in FIG. 4, which device may already have been fixed in place on slide 6, arm 94 is fixed in place (or placed upright) and the belt 67 on the pulley 68 of the headstock is replaced by belt 77. Slide 6 is locked against rotation and translation in relation to slide 5, slide 5 being freed on the section 22 by disengaging the advancing screw 35 by loosening jaws 36. Spring 93 attached between the support 74 and arm 94 holds the lever-forming part 85 against stop 92, these two parts determining the position of slide 5, i.e., the lateral position of headstock 7. The machine is thus ready to operate. Cam 75 is rotatably driven in the direction of arrow F either manually or automatically by means of a motor-reducer unit, not shown. During rotation, the profile 109 of cam 75 comes to abut against roller 111 fixed at the end of lever 78 and causes pivoting of this lever which in turn actuates the lever 81, sliding pin 91 and lever-forming part 85. Since part 85 is retained by stop 92, support 74 moves away from arm 94, together with all of the elements on slide 5. Since roller 111 follows the outline of cam 109, lever 78 oscillates about axle 79 with a constant amplitude. The depth of backing off is fixed by the distance of sliding pin 91 from the axis of shaft 82 of lever 81. This distance is adjustable by moving stud 89, enabling a backing off depth from zero to a given maximum value. The use of a system with two levers (78 and 81) enables a linear adjustment of the movement of slide 5 by moving the stud 89 along slot 87 so as to move sliding pin 91 along lever 81.

The point of action of the grinding wheel 15 on the cutter 8 may be displaced by acting on slide 4.

The three examples given above clearly show the universal character of this machine which enables an operator, by simple and rapid manipulations, to instantly pass from one mode of grinding to another, and from one type of tool to another without any waste of time.

The locking means for the various mobile elements such as slides, arms and capstan are of a classic type well known to persons skilled in the art and have not been shown so as to avoid needless complication of the drawings.

It is simple to provide a milling machine operating according to the same principle by replacing the grinding wheel 15 by a milling cutter. It would be particularly advantageous to machine a cutter such as cutter 8 by means of a milling machine of this type, since the cutting edge is generated by a movement identical to movement of the cutter during grinding thereof, so that milling will be carried out with a minimum removal of material along the entire cutting edge, notably between points 116 and 117, since no correction will be necessary to the machined shape.

What is claimed is:

1. A machine for machining workpieces, including spiral cylindrical cutters with hemispherical heads, comprising: a machine tool carrier, a machine tool rotatable about an axis, means for mounting said machine tool on said machine tool carrier and for horizontally orienting and inclining said axis; a generally horizontal carriage; means for setting the position of the carriage relative to the machine tool carrier in a generally horizontal plane, a support mounted on the carriage for rotation and inclination respectively about a vertical axis and a horizontal axis, a headstock including a rotatable spindle to support a workpiece to be machined, the headstock being slidably mounted on the support along a direction parallel to the axis of the spindle, the axis of the spindle being disposed to intersect said vertical axis with said intersecting axes defining a plane perpendicular to the horizontal axis, and a device mounted on the support for helicoidally driving the headstock spindle in response to the sliding movement of the headstock along the support.

2. A machine according to claim 1, in which said support includes a generally planar platform disposed with said horizontal axis lying in or generally parallel to the plane thereof, said device for helicoidally driving the headstock spindle including a rectilinear guide pivotally mounted on the platform about an axis perpendicular to the plane thereof and being orientable from 0° to 90° in relation to the direction of sliding of the headstock along the support, a cursor movable along the guide, and means for transforming the longitudinal and transversal components of movement of the cursor relative to said direction respectively into a sliding movement of the headstock along the support and a rotation of the headstock spindle about its axis.

3. A machine according to claim 2, in which said means for helicoidally driving the headstock spindle include means for driving the cursor along the guide, a projection on the cursor adapted to slidably engage a channel in a member carrying the headstock, which channel is disposed parallel to said horizontal axis, means for converting movement of the projection along the channel into a rotation of the headstock spindle, and means slidably connecting said member on the support.

* * * * *